Figure 1:
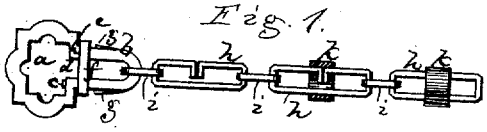

C. FAAS.

Watch-Chain Hooks.

No. 5,159.

Reissued Nov. 26, 1872.

Witnesses.
M. W. Frothingham.
Lott Bratiner.

Inventor.
Charles Faas.
by his Attys.
Crosby & Gould.

AM. PHOTO-LITHOGRAPHIC CO. N.Y. (OSBORNE'S PROCESS.)

UNITED STATES PATENT OFFICE.

CHARLES FAAS, OF NORTH ATTLEBOROUGH, MASSACHUSETTS.

IMPROVEMENT IN WATCH-CHAIN HOOKS.

Specification forming part of Letters Patent No. 81,354, dated August 25, 1868; reissue No. 5,159, dated November 26, 1872.

*To all whom it may concern:*

Be it known that I, CHARLES FAAS, of North Attleborough, in the county of Bristol and State of Massachusetts, have invented an Improvement in Watch Chains and Hooks; and I do hereby declare that the following, taken in connection with the drawing which accompanies and forms part of this specification, is a description of my invention sufficient to enable those skilled in the art to practice it.

The invention relates both to the construction of the hook by which the chain is attached to the garment and of the links of the chain. The hook consists of a large eye part and of a smaller bow part jointed thereto, one end of the bow-piece being pivoted to one part of the eye, and swiveling upon the pivot to open the eye, the other end of the bow-piece connecting with the other part of the eye, and a sliding band holding the eye and bow in position, this band being held in place by a spring or springs. Each long link of the chain is encompassed by a center fillet or band, which is so joined to the link as to strengthen and protect the link. It is in the construction of the hook and links that my invention consists.

The drawing represents a hook and chain embodying the invention.

Figure 2:
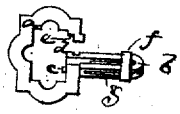

Figure 1 shows the hook and several of the links connected therewith. Fig. 2 shows the open hook.

*a* denotes the eye or large part of the hook that fastens to the button-hole; *b*, the bow or small part thereof, to which the end link of the chain is fastened. The bow *b* has a joint-pin, *c*, extending into the eye *a*, the eye turning upon this pin in opening it, as seen in Fig. 2. When the eye is closed a projection, *d*, of the bow enters a notch, *e*, of the eye, and a band, *f*, is slipped up to the eye (on the bow) to hold the bow and eye piece together, springs *g*, over and beyond which the band is slipped, locking the band in position, these springs being pressed in to slide the band back, so that the eye can be turned and opened. *h* denotes the main links, connected by shorter links *i* with each other and to the hook. At the center of each link a band or fillet, *k*, extends around it transversely, this band being fixed in position at the center of the link, and strengthening and protecting the link. The link may be formed of wire or of a piece of metal, the opposite ends of which meet at the center of the link, the band *k* covering the joint or connection of the ends.

In making the chain each link is encompassed by the fillet, which is made fast without soldering, the fillet being swaged upon the link by means of suitable dies.

I claim—

1. The eye *a*, bow *b*, band *f*, and springs *g*, connected and arranged substantially as shown and described.

2. The links, each having the center fillet *k*, which encompasses the link and is made fast thereto, substantially as described.

3. The link *h* having its joined ends covered by a band.

Executed this 28th day of October, A. D. 1872.

CHARLES FAAS.

Witnesses:
THEODORE BOREHOLT,
HENRY RICE.